Dec. 29, 1964 M. FISCHMAN ET AL 3,163,780

PULSE GENERATOR EMPLOYING CROSS-COUPLED COMPLEMENTARY TRANSISTORS WITH PARALLEL LC IN ONE CROSS COUPLING

Filed Nov. 21, 1962

INVENTOR.
MARTIN FISCHMAN
WILLIAM GELLER
BY
R. J. Frank 3,163,780

PULSE GENERATOR EMPLOYING CROSS-COUPLED COMPLEMENTARY TRANSISTORS WITH PARALLEL LC IN ONE CROSS COUPLING

Martin Fischman, Wantagh, and William Geller, Plainview, N.Y., assignors to General Telephone and Electronics Laboratories, Inc., a corporation of Delaware Filed Nov. 21, 1962, Ser. No. 239,265
3 Claims. (Cl. 307—88.5)

This invention relates to pulse generators and in particular to a mono-stable circuit which generates an output pulse of predetermined duration upon receipt of an input trigger signal.

It is an object of our invention to provide a highly stable pulse generator.

It is another object of the invention to provide a monostable pulse generator in which the duration of the output pulse is precisely controlled.

Still another object is to provide a mono-stable pulse generator capable of producing pulses of relatively long time duration.

In the present invention, a pulse generator is provided in which the duration of the output pulse is determined by the transient response of a resonant circuit driven by low impedance source. The circuit comprises first and second transistors of opposite conductivity type each having first, second, and third electrodes. The first electrodes of the two transistors are coupled together and the resonant circular is coupled between the third electrode of the first transistor and the second electrode of the second transistor. The resonant frequency of the resonant circuit determines the duration of the output pulse produced between the third and first electrodes of the second transistor. A feedback circuit couples the third electrode of the second transistor to the second electrode of the first transistor.

In one embodiment of the invention, the first and second transistors are types NPN and PNP respectively and the first, second and third electrodes are the emitter, base, and collector respectively. A series resonant circuit, consisting of an inductor and a capacitor, is connected between the collector of the first transistor and the base of the second transistor and a D.-C. feedback circuit is connected between the collector of the second transistor and the base of the first transistor. A bypass capacitor is provided across the inductor.

When the circuit is in its quiescent state, both transistors are cut off. Application of a trigger pulse between the base and emitter of the first transistor causes it to conduct driving its collector-emitter voltage down. This sudden change in voltage is coupled to the base of the second transistor causing it to conduct, drive its collector-voltage up, and maintain the first transistor in conduction by means of the feedback path. During the interval in which the transistors are turned on, the series resonant circuit is driven by the low impedance collector-emitter circuit of the first transistor. The base-emitter diode portion of the second transistor and the collector-emitter path of the first transistor provide a low impedance path for the oscillatory current and the first half cycle of the oscillatory current provides sufficient drive to maintain the second transistor in its conducting state. After a half cycle of oscillation the current goes through zero causing the second transistor to stop conducting. The regenerative connection between the collector of the second transistor and the base of the first transistor now causes both transistors to be cut off reverting to the initial state.

The above objects of and the brief introduction to the present invention will be more fully understood and further objects and advantages will become apparent from a study of the following description in connection with the drawings, wherein.

Figure 1:
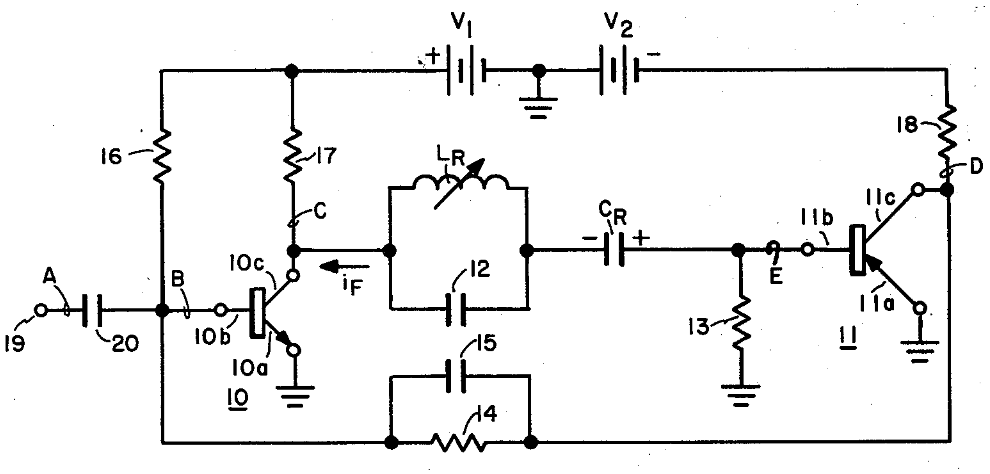
FIG. 1 is a schematic diagram of our invention.

As shown in FIG. 1, the pulse generator comprises a type NPN transistor 10 having emitter, base, and collector electrodes 10*a*, 10*b*, and 10*c* respectively and a type PNP transistor 11 having emitter, base and collector electrodes 11*a*, 11*b*, and 11*c* respectively. A series resonant circuit, consisting of an inductor $L_R$ and a capacitor $C_R$, is coupled between the collector electrode 10*c* of transistor 10 and the base electrode 11*b* of transistor 11. A bypass capacitor 12 is connected across inductor $L_R$ and a resistor 13 is connected between the base of transistor 11 and the grounded emitter of transistors 10 and 11. A feedback network consisting of a resistor 14 and capacitor 15 connected in parallel is coupled between the collector of transistor 11 and the base of transistor 10. The base and collector electrodes of transistor 10 are connected through resistors 16 and 17 respectively to the positive terminal of a voltage source $V_1$ and the collector of the second transistor is connected through a resistor 18 to the negative terminal of a voltage source $V_2$.

Figure 2:
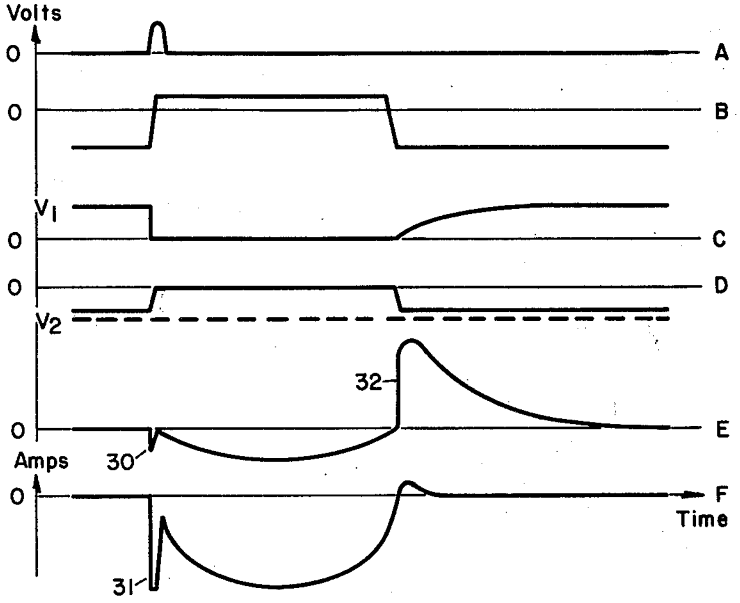
FIG. 2 depicts voltage and current waveforms useful in explaining the operation of the circuit of FIG. 1.

When the circuit is in its quiescent state, both transistors 10 and 11 are cut off. The base of transistor 10 (point B) is negative with respect to ground, the base voltage being determined by the voltage divider consisting of resistors 16, 14, and 18 connected across voltage sources $V_1$ and $V_2$. The voltage between point B and ground is shown in FIG. 2B and, similarly, the voltages at points A, C, D, and E with respect to ground are shown in FIGS. 2A, 2C, 2D, and 2E respectively. The voltage at the collector of transistor 10 has a value equal to the supply source $V_1$ as shown in FIG. 2C, the collector of transistor 11 is at a voltage somewhat below $V_2$ due to the voltage drop in resistor 18 (FIG. 2D) and the base of transistor 11 is at zero volts (FIG. 2E).

If a positive going voltagee pulse (FIG. 2A) is applied between input terminal 19 and ground, it is coupled to the base of transistor 10 by capacitor 20. This pulse drives transistor 10 into conduction causing the collector voltage (FIG. 2C) to drop abruptly to a value substantially equal to zero due to the very low saturation resistance resistance of the collector-emitter path of transistor 10. The base voltage of transistor 10 is somewhat positive since the base-emitter diode of this transistor has a resistance of approximately 5 ohms during conduction.

The drop in the collector voltage at point C produces a current surge through bypass capacitor 12 and capacitor $C_R$ to the base of transistor 11 causing the base-emitter voltage of this transistor to go negative thereby driving it rapidly into conduction. Capacitor 12 provides a low impedance path around inductor $L_R$, the negative spike 30 in the transistor 11 base waveform (FIG. 2E) being produced by the action of capacitor 12. When transistor 11 goes into conduction, its collector voltage (FIG. 2D) rises to zero due to the low collector-emitter saturation resistance and this voltage is coupled back through the network consisting of resistor 14 and a capacitor 15 to the base of transistor 10. The resulting regenerative feedback is of the proper polarity to maintain transistor 10 in conduction after the input pulse (FIG. 2A) has dropped to zero.

With both transistors in conduction a low impedance path exists through the series resonant circuit consisting of capacitor $C_R$ and inductor $L_R$, the collector-emitter path of transistor 10, and the emitter-base diode of transistor 11. During this interval, the series-resonant circuit is driven into oscillation producing a sinusoidal current flow $i_F$ (FIG. 2F) through transistors 10 and 11. (The spike 31 in the current waveform is produced by the initial surge of current through bypass capacitor 12 when transistor 10 is first driven into conduction.) After a half cycle of oscillation, the current $i_F$ goes through zero and reverses thereby turning transistor 11 off. The regenerative connection to the base of transistor 10 now causes both transistors to turn off reverting to the initial state.

At the time that $i_F$ goes through zero, the voltage across capacitor $C_R$ is charged, with the polarity shown, by an amount equal to twice the change in the collector voltage of transistor 10, i.e. $2V_1$. Thus, capacitor $C_R$ is charged with the proper polarity to hold transistor 11 in a nonconductive state until another positive pulse is applied to input terminal 19. The abrupt positive rise in voltage at the base of transistor 11 is shown at 32 in FIG. 2E. After the transistors are cut off, capacitor $C_R$ discharges through resistors 13 and 17. Following this discharge, the circuit is ready for retriggering.

The use of the feedback network consisting of resistor 14 and capacitor 15 provides a regenerative feedback path from high frequencies down to D.-C. due to the direct coupling through resistor 14. Capacitor 15 provides increased speed of response by transistor 10 to the leading and trailing edges of the output pulse.

In a typical circuit, the types and values of the components are as follows:

| | |
|---|---|
| Transistor **10** | Type 2N1409 |
| Transistor **11** | Type 2N711 |
| Inductor $L_R$ | 0.5 millihenry |
| Capacitor $C_R$ | 4700 micromicrofarads |
| Capacitor **12** | 220 micromicrofarads |
| Resistor **13** | 2200 ohms |
| Resistor **14** | 560 ohms |
| Capacitor **15** | 100 micromicrofarads |
| Resistor **16** | 1200 ohms |
| Resistor **17** | 2200 ohms |
| Resistor **18** | 220 ohms |
| Capacitor **20** | 4700 micromicrofarads |

The pulse duration is approximately equal to $$\pi\sqrt{L_R C_R}=5$$

microseconds. With this circuit, the change in the pulse duration is approximately 0.1% with a 20% change in supply voltage. The rise and decay times of the output pulse between the collector and emitter of transistor 11 are about 0.1 microsecond.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A pulse generator for producing an output voltage pulse comprising
   (*a*) first and second transistors of opposite conductivity types each having emitter, base, and collector electrodes, the emitter electrodes of said first and second transistors being coupled together,
   (*b*) a series resonant circuit coupled between the collector electrode of said first transistor and the base electrode of said second transistor, said series resonant circuit consisting of an inductor and a capacitor,
   (*c*) a bypass capacitor coupled across said inductor, and
   (*d*) feedback means coupling the collector electrode of said second transistor to the base electrode of said first transistor, said output voltage pulse being produced between the collector and emitter electrodes of said second transistor when a trigger signal is applied between the base and emitter electrodes of said first transistor.
2. The pulse generator defined by claim 1 wherein said feedback means comprises a resistor and a capacitor connected in parallel.
3. A pulse generator for producing an output voltage pulse comprising
   (*a*) first and second transistors of opposite conductivity types each having emitter, base, and collector electrodes, the emitter electrodes of said first and second transistors being coupled together,
   (*b*) a series resonant circuit coupled between the collector electrode of said first transistor and the base electrode of said second transistor, said series resonant circuit consisting of an inductor and a capacitor,
   (*c*) a bypass capacitor coupled across said inductor,
   (*d*) feedback means coupled between the collector electrode of said second transistor and the base electrode of said first transistor, said feedback means comprising a resistor and a capacitor connected in parallel,
   (*e*) a resistor coupled between the base and emitter of said second transistor, and
   (*f*) first and second voltage sources, said first voltage source being coupled to the base and collector electrodes of said first transistor and said second voltage source being coupled to the collector electrode of said second transistor, said output voltage pulse being produced between the collector and emitter electrodes of said second transistor when a trigger signal is applied between the base and emitter electrodes of said first transistor.

References Cited in the file of this patent

UNITED STATES PATENTS 3,065,362 Benson ---------------- Nov. 20, 1962